(12) United States Patent
Fan et al.

(10) Patent No.: US 9,129,382 B2
(45) Date of Patent: Sep. 8, 2015

(54) METHOD AND SYSTEM FOR BRAIN TUMOR SEGMENTATION IN MULTI-PARAMETER 3D MR IMAGES VIA ROBUST STATISTIC INFORMATION PROPAGATION

(75) Inventors: Yong Fan, Beijing (CN); Hongming Li, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 548 days.

(21) Appl. No.: 13/000,255

(22) PCT Filed: Jun. 25, 2010

(86) PCT No.: PCT/CN2010/074517
§ 371 (c)(1),
(2), (4) Date: Jan. 6, 2012

(87) PCT Pub. No.: WO2011/160309
PCT Pub. Date: Dec. 29, 2011

(65) Prior Publication Data
US 2012/0093381 A1    Apr. 19, 2012

(51) Int. Cl.
*G06K 9/00*    (2006.01)
*G06T 7/00*    (2006.01)

(52) U.S. Cl.
CPC ............. *G06T 7/0081* (2013.01); *G06T 7/0087* (2013.01); *G06T 7/0093* (2013.01);
(Continued)

(58) Field of Classification Search
USPC ......... 382/100, 128–132, 173, 298, 294, 300; 128/920; 600/101, 109, 112, 114, 600/117–118, 139, 145, 173, 415, 416, 420, 600/427, 434, 562, 587; 700/57, 245
See application file for complete search history.

(56) References Cited

U.S. PATENT DOCUMENTS 7,865,002 B2 *    1/2011    Basilico et al. ............... 382/128
8,315,451 B2 *    11/2012    Kruger et al. ................ 382/131
(Continued)

FOREIGN PATENT DOCUMENTS

CN    1843295 A    10/2006
CN    1873657 A    12/2006
(Continued)

OTHER PUBLICATIONS

Guohong Liao, et al, Medical image segmentation based on Support Vector Machine approach Computer Engineering and Applications, Computer Engineering and Applications, 2007, 43(29), p. 217-219.
Haiyang Xu, et al, Segmentation of Magnetic Resonance Brain Tissues Image Based on Support Vector Machines, Journal of Image and Graphics, Oct. 2005, vol. 10, No. 10, p. 1275-1280.
(Continued)

*Primary Examiner* — Hadi Akhavannik
(74) *Attorney, Agent, or Firm* — Patterson Thuente Pedersen, P.A.

(57) ABSTRACT

A method for brain tumor segmentation in multi-parametric 3D MR images. The method comprises: pre-processing an input multi-parametric 3D MR image; classifying each voxel in the pre-processed multi-parametric 3D MR image, determining the probability that the voxel is part of a brain tumor, and obtaining an initial label information for the image segmentation based on the classification probability; constructing a graph based representation for the pre-processed image to be segmented; and generating the segmented brain tumor image using the initial label information and graph based representation. This method tries to exploit the local and global consistency of the image to be segmented for the tumor segmentation and can alleviate partially the performance degradation caused by the inter-subject image variability and insufficient statistical information from training.

15 Claims, 3 Drawing Sheets

(52) U.S. Cl.
CPC ............... *G06T2207/10088* (2013.01); *G06T 2207/20081* (2013.01); *G06T 2207/30016* (2013.01); *G06T 2207/30096* (2013.01)

(56) References Cited

U.S. PATENT DOCUMENTS

| | | | |
|---|---|---|---|
| 2007/0064983 | A1 | 3/2007 | Huang et al. |
| 2008/0101674 | A1* | 5/2008 | Begelman et al. ............ 382/130 |
| 2008/0170769 | A1 | 7/2008 | Assmann |
| 2010/0027865 | A1* | 2/2010 | Wels et al. ................... 382/131 |
| 2010/0260396 | A1* | 10/2010 | Brandt et al. ................. 382/131 |

FOREIGN PATENT DOCUMENTS

| | | |
|---|---|---|
| CN | 101061509 A | 10/2007 |
| CN | 100378752 C | 4/2008 |
| CN | 101334895 A | 12/2008 |
| CN | 100586368 C | 2/2010 |

OTHER PUBLICATIONS

Nan Zhang, et al, Multi-kernel SVM based classification for brain tumor segmentation of MRI multi-sequence, IEEE Xplore, Dec. 2009, p. 3373-3376.

Ruan Su, et al, Tumor Segmentation From a Multispectral MRI Images by Using Support Vector Machine Classification, IEEE Xplore, Dec. 2007, p. 1236-1239.

Sled, John G., et al., "A Nonparametric Method for Automatic Correction of Intensity Nonuniformity in MRI Data," *IEEE Transactions on Medical Imaging*, vol. 17, No. 1, pp. 87-97 (Feb. 1998).

Smith, Stephen M., "Fast Robust Automated Brain Extraction," *Human Brain Mapping*, vol. 17, pp. 143-155 (2002).

Smith, Stephen M., et al., "Advances in functional and structural MR image analysis and implementation as FSL," *NeuroImage*, vol. 23, pp. S208-S219 (2004).

Zhou, Dengyong, et al., "Learning with Local and Global Consistency," *Advances in Neural Information Processing Systems*, pp. 321-328 (2004).

* cited by examiner 102  104  106  108

METHOD AND SYSTEM FOR BRAIN TUMOR SEGMENTATION IN MULTI-PARAMETER 3D MR IMAGES VIA ROBUST STATISTIC INFORMATION PROPAGATION

PRIORITY CLAIM

The present application is a National Phase entry of PCT Application No. PCT/CN2010/074517, filed Jun. 25, 2010, the disclosure of which is hereby incorporated by reference herein in its entirety.

TECHNICAL FIELD

The present invention relates to medical image processes, and particularly to fully automatic segmentation of brain tumors in multi-parametric 3D MR images.

BACKGROUND ART

Detection and segmentation of brain tumors in magnetic resonance images is of great importance in medical diagnosis. Reliable and precise tumor segmentation provides helpful information for surgical planning and therapy accessing. The tumor segmentation can also be used for general modeling of a pathological brain and the construction of pathological brain atlases. However, manual segmentation of brain tumor images commonly used in clinics is time-consuming, labor-intensive and subjective to considerable variation in intra- and inter-rater performance. Accordingly, a method for fully automatic brain tumor segmentation is desirable. Diligent efforts have been made to achieve time-efficient, accurate, and reproducible tumor segmentation. It however remains a challenging task to achieve robust segmentation as brain tumors differ much in appearance, location, size, and shape.

Recently, graph based image segmentation methods have been used for medical image segmentation, such as graph cut, random walks, and the like. The graph cut segments an image using region and edge based information, wherein the region based information is achieved by calculating the probability of each pixel belonging to the foreground/background, and the edge based information is measured by the feature similarity between pixels, including image intensity similarity and spatial proximity. Wels et al., "Method and System for Brain Tumor Segmentation in 3D Magnetic Resonance Images", U.S. patent Application Publication, Pub. No.: US 2010/0027865 utilizes the PBT (probabilistic boosting tree) classifier and graph cut comprehensively to segment a brain tumor, in which the PBT classifier achieved from the training dataset is used to provide the measurement of region based information and the image intensity similarity is used as the edge based information. However, the supervised PBT classifier relies on the image consistency between training images and the image to be segmented, and its performance may be degraded by image noise, MR image bias field and inter-subject image variability. The region based information totally from the trained statistical information is not always reliable, and the unreliability will lead to inaccurate graph cut segmentation results. Furthermore, the edge based information measured only between neighboring voxels is not robust to the image noises, and may affect the performance for the detection of a tumor boundary.

SUMMARY OF THE INVENTION

The objective of this invention is to segment a brain tumor in a multi-parametric 3D MR image, automatically. To realize this, an automatic method is provided, compromising:

pre-processing an input multi-parametric 3D MR image; and classifying each voxel in the pre-processed multi-parametric 3D MR image, determining the probability that the voxel is part of a brain tumor, and obtaining the initial label information for the image segmentation based on the classification probability; and constructing a graph based representation for the pre-processed image; and generating the segmented brain tumor image using the initial label information and graph based representation.

This method tries to exploit the local and global consistency of the image to be segmented for the tumor segmentation, therefore, it can partially alleviate the performance degradation caused by the inter-subject image variability and insufficient statistical information from training.

DETAILED DESCRIPTION

The present invention is directed to a method for automatic brain tumor segmentation in 3D MR images. Embodiments of the present invention are described herein to give a demonstration of this brain tumor segmentation method.

Figure 1:
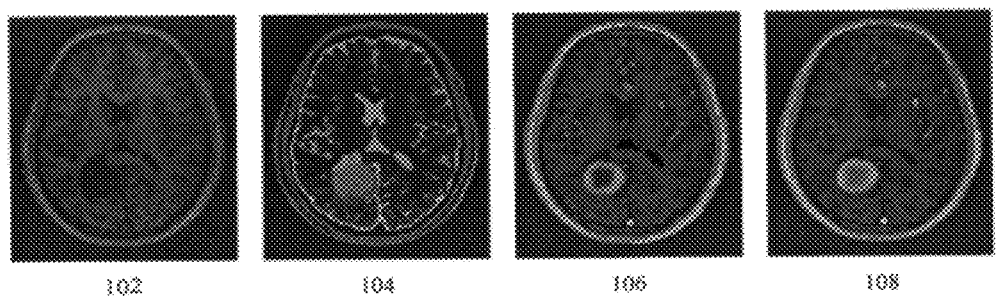
FIG. 1 illustrates exemplary MR images showing a brain tumor.

Embodiments of the present invention are directed to fully automatic brain tumor segmentation in multi-parametric 3D MR images. A multi-parametric 3D image sequence can include T1 weighted MR volume, T2 weighted MR volume, the contrast enhanced T1 weighted MR volume, just to name a few. FIG. 1 illustrates exemplary MR images showing a brain tumor. As illustrated in FIG. 1, images 102, 104, 106 show an axial slice of a multi-parametric 3D MR image sequence. In particular, image 102 shows a T1 weighted image, image 104 shows a T2 weighted image, image 106 shows a contrast enhanced T1 weighted image, and image 108 shows an annotated gro and truth of a brain tumor overlaid with the contrast enhanced T1 weighted image.

Embodiments of the present invention provide a segmentation method that integrates a strong discriminative observation model trained by the support vector machine (SVM) and lower-level segmentation via graph based label information propagation. The trained SVM classifier is used for label information initialization and the graph based label information propagation that takes into account the pair-wise multi-parametric voxel intensity similarity, anatomical spatial proximity and multi-parametric image boundary information leads to the final tumor segmentation. The discriminative model relies not only on observed local intensities but also on surrounding spatial context in the multi-parametric 3D MR image to initialize the label of regions for pathological and healthy tissues.

Figure 2:
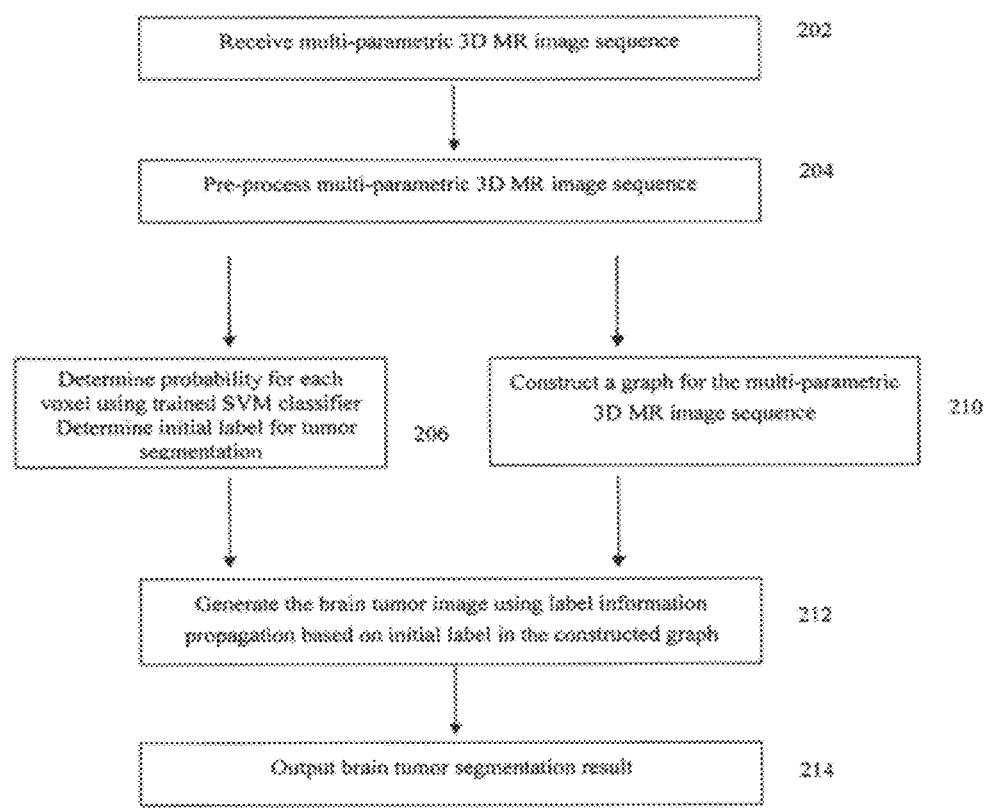
FIG. 2 illustrates the method for brain tumor segmentation in multi-parametric 3D MR images according to an embodiment of the present invention.

FIG. 2 illustrates a method for brain tumor segmentation in a sequence of multi-parametric 3D MR images according to an embodiment of the present invention.

At step 202, a sequence of multi-parametric 3D MR images is received. The sequence of multi-parametric 3D MR images is a sequence of 3D MR images acquired at different pulse sequences including T1 weighted MR volume, T2 weighted MR volume and the contrast enhanced T1 weighted MR volume. Accordingly each voxel in the multi-parametric MR sequence has three intensity values, one for each of the 3D MR images.

At step 204, the multi-parametric 3D MR images are pre-processed. The pre-process is performed by the following well-known techniques: 1) co-registration to compensate for possible motions between multi-parametric 3D MR scans; 2) skull stripping to remove non-brain tissue in multi-parametric 3D MR images; 3) bias field correction to remove intensity inhomogeneity partially in multi-parametric 3D MR images; 4) inter-subject intensity standardization. These techniques are described in detail in Smith et al., "Advances in Functional and Structural MR image Analysis and Implementation as FSL", NeuroImage 23 (2004), pgs. 208-219, Smith, "Fast robust Automated Brain Extraction", Human Brain Mapping 17 (2002), pgs. 143-155, Sled et al., "A Nonparametric Method for Automatic Correction of Intensity Non-uniformity in MRI Data", IEEE Trans. Med. Imaging 17 (1998), pgs. 87-97, respectively, all of which are incorporated herein by reference.

At step 206, a trained SVM classifier is used to determine for each voxel the probability that the voxel is part of a tumor in multi-parametric 3D MR image. SVM can combine many features and seek for the classification hyperplane with the largest margin in the feature space and minimize the number of wrongly classified examples in the training data. The feature vector for each voxel used in SVM classification consists of multi-parametric images intensity information of voxels in its spatial neighborhood. The SVM classifier is trained using expert annotated training data while the classifier parameters are tuned using a cross-validation method. In an embodiment of this invention, the trained SVM classifier is applied to the images to be segmented and provides each voxel with a label indicating tumor or healthy tissue and a probability measure indicating the reliability of classification. Voxels with tumor or healthy tissue probability measures higher than a threshold are selected to initialize the label of the graph theory based segmentation.

At step 210, a weighted graph G(V, E) is constructed for the multi-parametric 3D MR image, in which each vertex of V corresponds to one voxel with multi-parametric intensities as an intensity vector. The pair-wise graph edge of E measure s the similarity of two connected verticies that takes image intensity similarity, anatomical spatial proximity and multi-parametric image edge information into account. According to this implementation, the tumor segmentation can be translated into assigning a label for each vertex in the graph as foreground or background representing tumor or healthy tissue respectively. Given labeling information of a small number of graph verticies, labels of unlabeled verticies of the graph can be predicted by exploiting the consistency between verticies based on the cluster assumption that nearby verticies or verticies on the same structure are likely to have the same label. The labeling problem can be solved by minimizing the following cost function:

$$Q(F)=F^T(I-S)F+\mu(F-L_{ini})^T(F-L_{ini}) \quad (1)$$

where I is an identity matrix and S is the normalized edge weight matrix, F is the segmentation label matrix and $L_{ini}$ is the initial label matrix. The first term in eqn. (1) is a local consistency constraint to make nearby nodes having similar labels, and the second term measures the consistency between the labeling result and the initial label information. These two terms are balanced by the parameter μ to obtain a labeling with local and global consistency.

It is worth noting that label information of unlabeled nodes is updated by the spread of label information of other nodes according to their corresponding edge weights. For successful segmentation it is critical to get a few reliably labeled nodes and properly defined edge weights. According to an embodiment of the present invention, $L_{ini}$ is provided by a SVM classifier. For the graph edge weight definition, voxel multi-parametric intensity similarity, anatomical spatial proximity and multi-parametric image edge information is taken into consideration:

$$w_{ij}=e_{ij}^I \times e_{ij}^L \times e_{ij}^g, \quad (2),$$

where $e_{ij}^I$ and $e_{ij}^L$ are measures of image intensity similarity and spatial proximity, $e_{ij}^g$ is an image edge information term, i and j are different verticies in the graph. The image intensity similarity and spatial proximity terms $e_{ij}^I$ and $e_{ij}^L$ are defined as:

$$e_{ij}^I = e^{-\frac{\|F_i - F_j\|^2}{\sigma_F^2}}, \quad (3)$$

$$e_{ij}^L = \begin{cases} e^{-\frac{\|L_i - L_j\|^2}{\sigma_L^2}} & \text{if } \|L_i - L_j\| < r \\ 0 & \text{otherwise,} \end{cases} \quad (4)$$

where $F_k$ refers to the image intensity vector of the vertex k, $L_k$ is the spatial location of the vertex k, and $\sigma_F$ and $\sigma_L$ are free parameters controlling scales of the kernels. The image edge information is embedded in an "edge stopping" function which could be any monotonically decreasing function to make it robust to image noise. In particular, a function based on Turkey's biweight robust estimator for embedding image gradient information between verticies is used herein and the image edge information term is defined as:

$$e_{ij}^g = \begin{cases} \frac{1}{2}[1 - (G_{ij}/\sigma_g)^2]^2 & \text{if } G_{ij} \leq \sigma_{g'} \\ 0 & \text{otherwise,} \end{cases} \quad (5)$$

where $G_{ij}$ is the maximum image gradient magnitude along the i-j direction between voxels and j, and $\sigma_g$ is a free parameter controlling the spatial scale of the function. This term works as an indicator to the presence of an image boundary between voxels i and j. A small value of $e_{ij}^g$ means the probability that they are located in the same region is low and the information propagation between them should be limited. The value of $\sigma_g$ can be estimated using robust statistics. The $e_{ij}^g$ term makes the parameter selection more stable as it tries to constrain the information propagation between nodes from different object regions.

At step 212, the segmented brain tumor image is generated based on the initial label for segmentation at step 208 and the graph obtained at step 210. The object function expressed in Equation (1) can be optimized by a label propagation procedure, the minimization of Q(F) can be solved using an iterative procedure which has been demonstrated to converge to the optimal solution:

$$F^{m+1}=(1-\alpha)SF^m+\alpha L_{ini}, \quad (6)$$

where $F^k$ is the updated label information at the k-th iteration, $F^0$ is equivalent to the $L_{ini}$, 0<α<1 is a parameter related to μ, trading off the information from the initial labeling and the prediction results of other nodes. This iterative procedure can be regarded as label information propagation. Every node absorbs the label information from other nodes and retains part information of its initial state at each iteration. The label information is updated until convergence and each unlabeled node is set to the label of the class from which it receives the most information. This results in a binary mask image that assigns each voxel in the multi-spectral MR image sequence a foreground or background label. Voxels labeled as foreground make up the brain tumor in the 3D MR image. For example details on setting up and solving this problem are described in Zhou et al., "Learning with local and global consistency", Advances in Neural Information Processing Systems (2004), pgs. 321-328, which is incorporated herein by reference.

At step 214, the brain tumor segmentation results are output. The output can be overlaid on the multi-parametric 3D MR images, generating the segmented brain tumor image.

Figure 3:
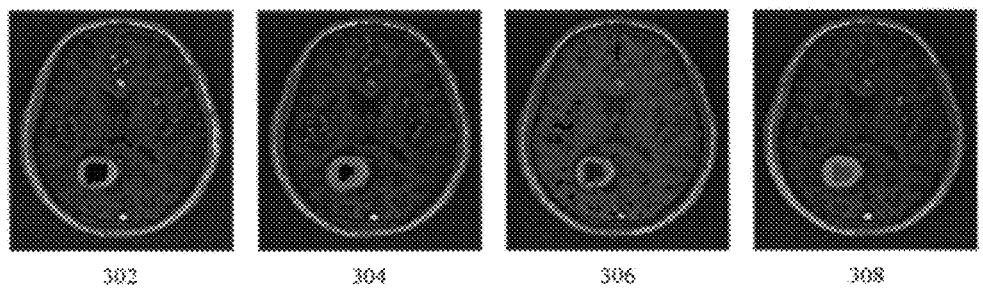
FIG. 3 illustrates an exemplary brain tumor segmentation result for the image in FIG. 1.

FIG. 3 illustrates exemplary brain tumor segmentation results of the MR images of FIG. 1 using the proposed method. As illustrated in FIG. 3, image 302 shows the same axial slice of the contrast enhanced T1 weighted image as the image 106 in FIG. 1, image 304 shows the segmentation of the brain tumor using the output probability of the SVM classifier only, image 306 shows the segmentation initialization of the brain tumor (colored red) and health tissue (colored blue), image 308 shows the final segmentation of the brain tumor. All the results at different segmentation stages are overlaid with the contrast enhanced T1 weighted image. It is shown that the method can successfully segment the brain tumor by comparing image 308 in FIG. 3 with image 108 in FIG. 1.

Rather than performing brain tumor segmentation within the existing frameworks, the described automatic method utilizes reliable statistical tumor information obtained from a support vector machine (SVM) classifier to guide the graph theory based segmentation. The key elements of an embodiment of the method are: 1) A statistical model is built using SVM based on expert annotated training images to provide reliable statistical tumor information; 2) a graph theoretic semi-supervised learning approach is utilized to propagate the reliable statistical tumor information to all image space with local and global consistency; 3) a robust "edge stopping" function is adopted to embed image boundary information in the graph edge weight measurement for limiting information propagation between image voxels of different properties.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A method for brain tumor segmentation in multi-parametric 3D magnetic resonance (MR) images, comprising:
   pre-processing an input multi-parametric 3D MR image;
   classifying each voxel in the pre-processed multi-parametric 3D MR image, determining and assigning a classification probability that the voxel is part of a brain tumor;
   labeling voxels if their classification probabilities are higher than a selected threshold;
   obtaining initial label information for image segmentation using only labeled voxels;
   constructing a graph based representation for the pre-processed image to be segmented; and
   generating the segmented brain tumor image using the initial label information and graph based representation.

2. The method of claim 1, wherein
   classifying each voxel in the image to be segmented and determining its corresponding classification probability using a support vector machine (SVM) based classifier.

3. The method of claim 1, wherein
   constructing a feature vector for each voxel based on the multi-parametric image intensity information of voxels in its spatial neighborhood.

4. The method of claim 3, comprising classifying the feature vector of each voxel using the SVM classification method.

5. The method of claim 1, wherein constructing the graph representation for the image to be segmented comprises:
   establishing nodes,
   each node corresponding to one voxel in the multi-parametric MR image and the weight of each edge connecting two nodes corresponds to the feature similarity measurement between the two nodes connected.

6. The method of claim 4, wherein each vertex in the graph has a label and the method further comprises:
   determining whether the SVM classification is reliable for each node based on the classification probability, and initializing the label information of the node if reliable.

7. The method of claim 5, wherein said feature similarity measurement between connected nodes compromises:
   the multi-parametric image intensity similarity, the spatial proximity, and edge information between verticies in the multi-parametric image being considered.

8. The method of claim 1, wherein said step of generating the segmented brain tumor image comprises:
   optimizing a corresponding object function for segmentation iteratively based on the initial label information and an edge weight in the graph.

9. A method for brain tumor segmentation in multi-parametric 3D magnetic resonance (MR) images, comprising:
   pre-processing an input multi-parametric 3D MR image;
   classifying each voxel in the pre-processed multi-parametric 3D MR image by a support vector machine (SVM) based classifier to determine a classification probability that the voxel is part of a brain tumor for each voxel;
   labeling those voxels for which the determined classification probability exceeds a selected threshold as initial label information for image segmentation;
   constructing a graph based representation for the pre-processed image to be segmented; and
   generating the segmented brain tumor image using the initial label information and graph based representation.

10. The method of claim 9, further comprising:
    constructing a feature vector for each voxel based on the multi-parametric image intensity information of voxels in its spatial neighborhood.

11. The method of claim 10, further comprising:
    classifying the feature vector of each voxel using the SVM classification method.

12. The method of claim 9, wherein constructing the graph based representation for the image to be segmented, further comprises:
    establishing nodes, each node corresponding to one voxel in the multi-parametric MR image and the weight of each edge connecting two nodes corresponds to a feature similarity measurement between the two nodes connected.

13. The method of claim 9, wherein each vertex in the graph based representation has a label and the method further comprises:

determining whether the SVM classification is reliable for each node based on the classification probability, and initializing the label information of the node if reliable.

14. The method of claim 13, wherein said feature similarity measurement between connected nodes compromises the multi-parametric image intensity similarity, the spatial proximity, and edge information between verticies in the multi-parametric image being considered.

15. The method of claim 9, wherein said step of generating the segmented brain tumor image comprises:
optimizing a corresponding object function for segmentation iteratively based on the initial label information and an edge weight in the graph.

* * * * *